United States Patent [19]

Gotfryd et al.

[11] Patent Number: 5,033,083
[45] Date of Patent: Jul. 16, 1991

[54] TELEPHONE LINE SWITCH APPARATUS

[75] Inventors: Casimer Gotfryd, Wauconda; James F. Oneby, Northlake, both of Ill.

[73] Assignee: AT&T Bell Laboratories, Murray Hill, N.J.

[21] Appl. No.: 414,562

[22] Filed: Sep. 29, 1989

[51] Int. Cl.⁵ ............................................. H04M 1/00
[52] U.S. Cl. ................................... 379/427; 379/422; 379/424; 379/446; 379/448
[58] Field of Search ............... 379/422, 424, 426, 427, 379/447, 448, 449, 450

[56] References Cited

U.S. PATENT DOCUMENTS

| | | | |
|---|---|---|---|
| 2,273,530 | 2/1942 | King | 379/427 |
| 2,443,799 | 6/1948 | Nilsson | 379/427 |
| 2,566,840 | 4/1951 | Krumreich | 379/427 |
| 4,710,954 | 12/1987 | Doyle et al. | 379/427 |
| 4,790,008 | 12/1988 | Bohannon | 379/427 |

*Primary Examiner*—Jin F. Ng
*Assistant Examiner*—Jhancy Augustus
*Attorney, Agent, or Firm*—D. A. Marshall

[57] ABSTRACT

A telephone line switch actuating mechanism includes two identical parts, each having a portion which makes up a plunger, while the remaining portion is pivotally mounted for enabling the two parts to be assembled in an opposing relationship to each other into a mechanism such that depression of either plunger activates the other plunger and the telephone line switch.

12 Claims, 3 Drawing Sheets

TELEPHONE LINE SWITCH APPARATUS

TECHNICAL FIELD

This invention relates generally to telephone apparatus and more particularly to apparatus of such kind including a line switch for a telephone set and mechanism for actuating such switch.

BACKGROUND OF THE INVENTION

The conventional residential telephone set comprises a handset and a stand providing on its top a cradle for the handset. Included in the stand is a line switch and switchhook mechanism which usually comprises (a) vertically movable plungers passing from the cradle through holes in the stand's housing into its interior, and (b) a motion coupling linkage extending in such interior from the bottoms of the plungers to the switch and responsive to movement of the plungers between up and down positions therefor to shift contacts in the line switch means between open and closed conditions therefor. The operation of such mechanism is such that the weight of the handset in the cradle depresses the plungers to cause the mechanism to maintain the mentioned contact open or closed as appropriate for the ON-HOOK condition of the telephone set. When, however, the handset is lifted off the cradle, the removal of its weight from the plungers causes the mechanism to change the conditions of the contacts to that appropriate for the OFF-HOOK condition of the set, and for signaling the central office that the set is OFF-HOOK.

In the past, motion coupling linkages of the sort described above have tended to be complex in their action by virtue of converting the original simple vertical movement of the plungers into one or more other linkage movements differing in direction and magnitude from such original movement and from each other. Also such linkages have often had a large number of parts and have, on that account, been expensive.

Additionally, since such mechanisms are housed in telephone housings, wherein as a rule sufficient space is available for locating the mechanisms, the overall size of the mechanisms tends to be on the bulky side.

While the characteristics of complexity and high cost of the mechanisms are significant disadvantages for use in telephone sets, the size of such mechanisms makes it virtually impossible to incorporate such mechanisms in handset cradles which extend from a side of a telephone set or a communications terminal, and especially so when design requirements are such that from the aesthetic standpoint the handset cradle has to be as slim as possible and from the reliability standpoint it has to be strong enough to serve as a handhold to be used by an operator to move the phone or the terminal.

SUMMARY OF THE INVENTION

These and other disadvantages are overcome in accordance with our invention by providing a switchhook mechanism which includes two identical parts, each having a portion which makes up a plunger while the remaining portion is pivotally mounted for enabling the two parts to be assembled in an opposing relationship to each other into a mechanism such that depression of either plunger activates the other plunger and the telephone line switch.

DETAILED DESCRIPTION

Figure 1:
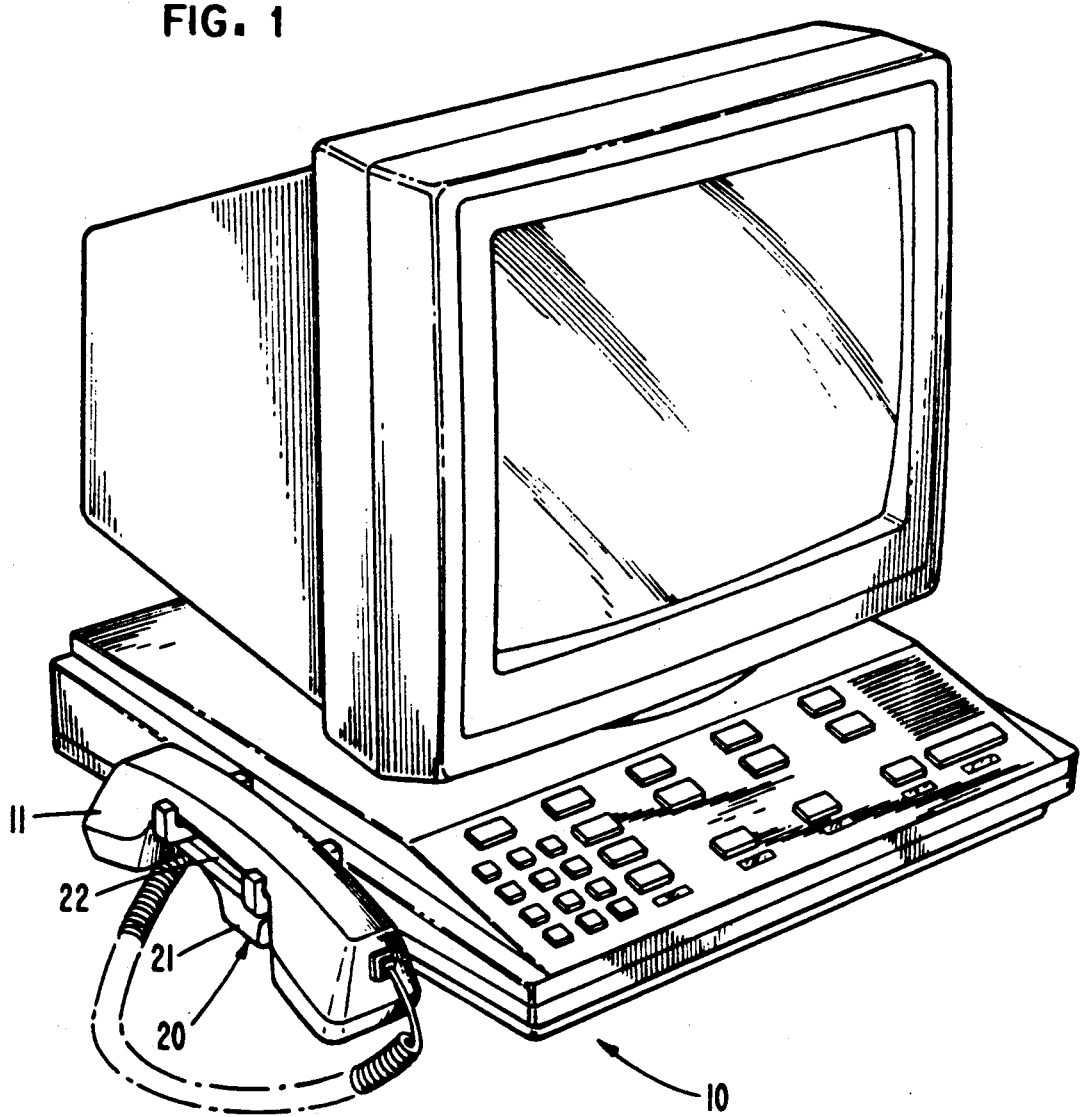
FIG. 1 is a perspective view of a terminal showing a telephone handset resting on a handset cradle assembly embodying the present invention.

Referring now to FIG. 1, there is shown a display terminal, generally designated 10, having a telephone handset cradle assembly, generally designated 20, extending from one side of the terminal. A telephone handset 11 is shown located on top of the handset cradle assembly 20.

Figure 2:
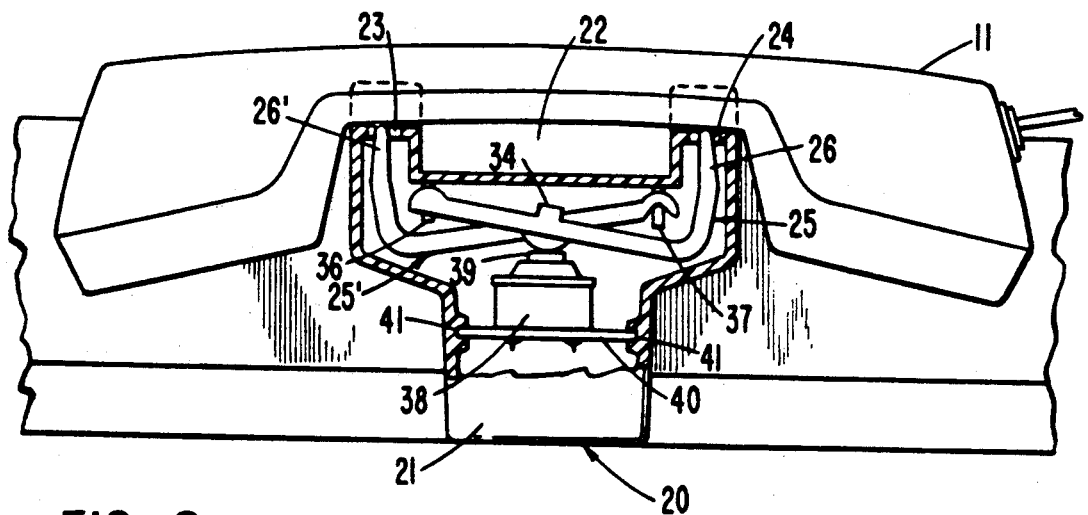
FIG. 2 is a partial left side view of the terminal shown in FIG. 1, showing a cross-sectional view of the handset cradle assembly.

The major elements of this invention are best seen in FIG. 2 and include a handset cradle housing 21, having on its top surface a cradle 22 for the telephone handset 11. Extending vertically down through the housing 21, from its cradle region to the housing's interior, are laterally spaced rectangular openings 23 and 24.

Figure 3:
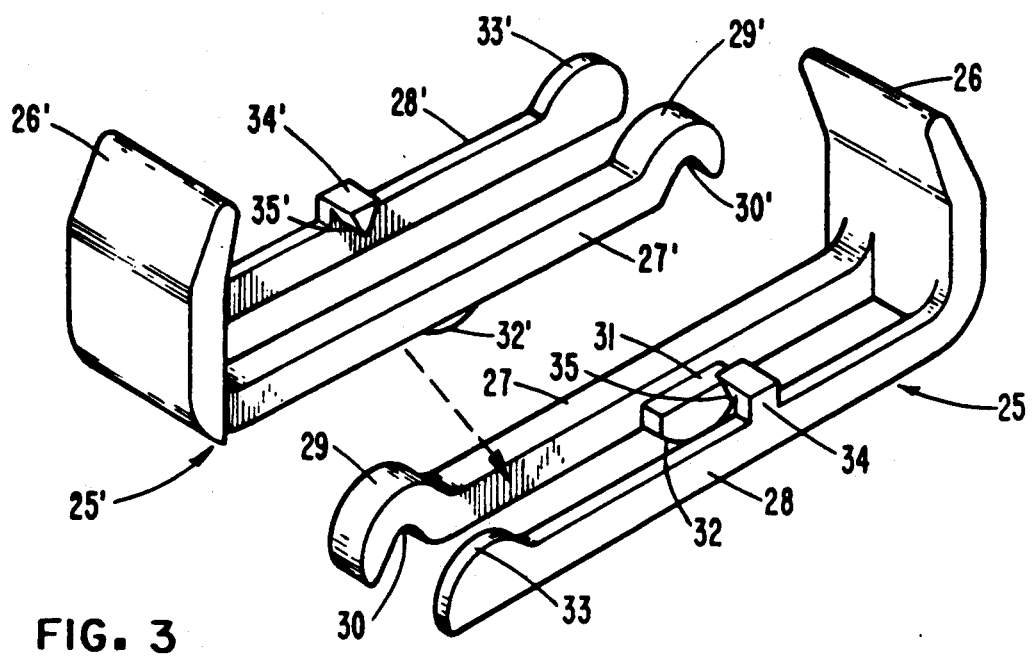
FIG. 3 is a perspective view of the major elements forming a switchhook mechanism.

Disposed in the housing 21, below the openings 23 and 24, is a pivotally mounted mechanism which includes two identical parts 25 and 25'. Parts 25 and 25' are best illustrated in FIG. 3 and a detailed discussion of the parts will be directed only to part 25, with the understanding that part 25' is identical to part 25. One end of part 25 is formed into a substantially rectangular plunger 26, with dimensions such that it moves freely through either of the openings 23 or 24. Extending from the plunger 26, and substantially perpendicular to it, is a pair of bifurcated fingers 27 and 28. Finger 27 terminates in a curved portion 29, having a substantially v-shaped notch 30 located on the side opposite the curved portion 29. A projection 31, located substantially halfway between the plunger 26 and the curved portion 29, extends partially from one side of the finger 27 towards the finger 28, terminates in a curved surface 32, which extends below the finger 27 opposite in the direction of the extension of plunger 26. Finger 28 terminates in a curved surface 33. A projection 34 first extends from a surface of finger 28 in the same direction as the plunger 26 and then partially towards member 27. Projection 34 is located opposite to projection 31 of finger 27 and the portion of projection 34 extending towards finger 27 terminates in a knife edge surface 35.

Figure 4:
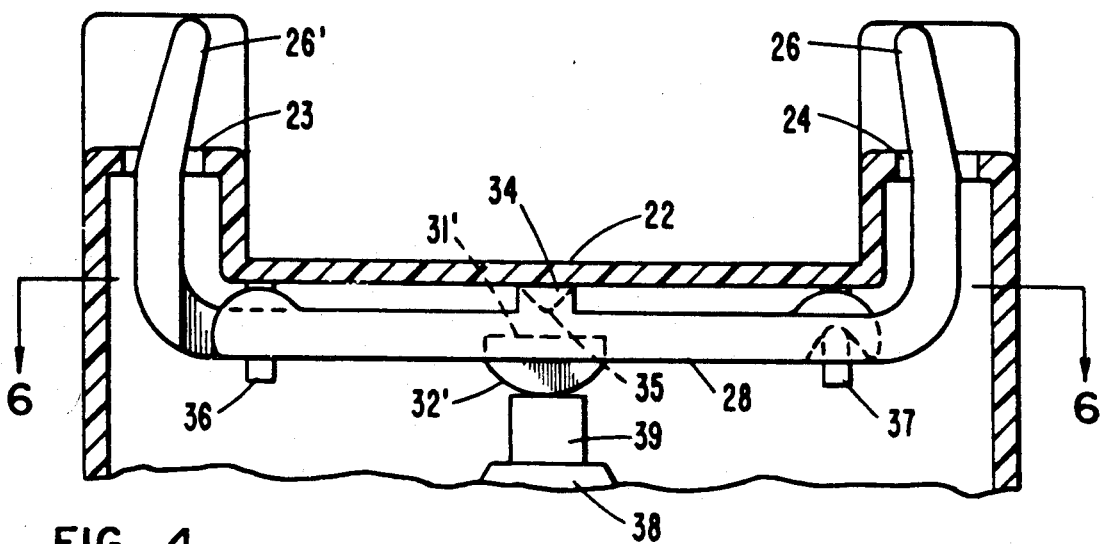
FIG. 4 is a cross-sectional view of the handset cradle assembly as shown in FIG. 2 with the handset removed, i.e. the plungers in their uppermost position and the telephone set in an off-hook state.
Figure 6:
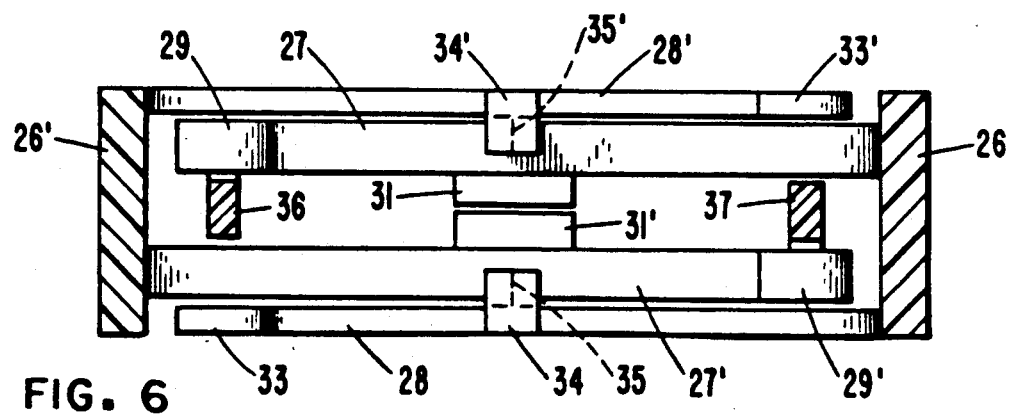
FIG. 6 is a sectional view of the handset cradle assembly taken generally along the line 6—6 of FIG. 4.

The two members 25 and 25' are assembled by first placing the members in an opposing relationship as best shown in FIGS. 3 and 6, such that knife edge 35 sits on top of finger 27' and knife edge 35' sits on top of finger 27. Plungers 26 and 26' are then inserted through opening 24 and 23 respectively, from inside the housing 21 such that they project above the housing as shown in FIG. 4. A pair of projections 36 and 37, extending from the cradle 21 into the housing, are engaged by the v- shaped notches 31 and 31' of fingers 27 and 27' respectively, whereby the projections 36 and 37 provide pivot points for the two fingers 27 and 27', i.e. for members 25 and 25'.

Disposed in the cradle housing 21, below the assembled members 25 and 25' is a line switch 38, having a spring biased actuator piston 39. Switch 39 is mounted on top of a printed circuit board 40, which in turn is mounted within the housing 21 by having two of its edges engage slots 41 located in the walls of the housing 21. The actuator piston 39 makes contact with curved surfaces 32 and 32' of projections 31 and 31' respectively and the spring (not shown) biasing the actuator piston 39 is of sufficient strength to push the two members 25 and 25' up and against the top portion of the housing 29 until projections 34 and 34' contact the region under the cradle 21 area, as best shown in FIG. 4.

Figure 5:
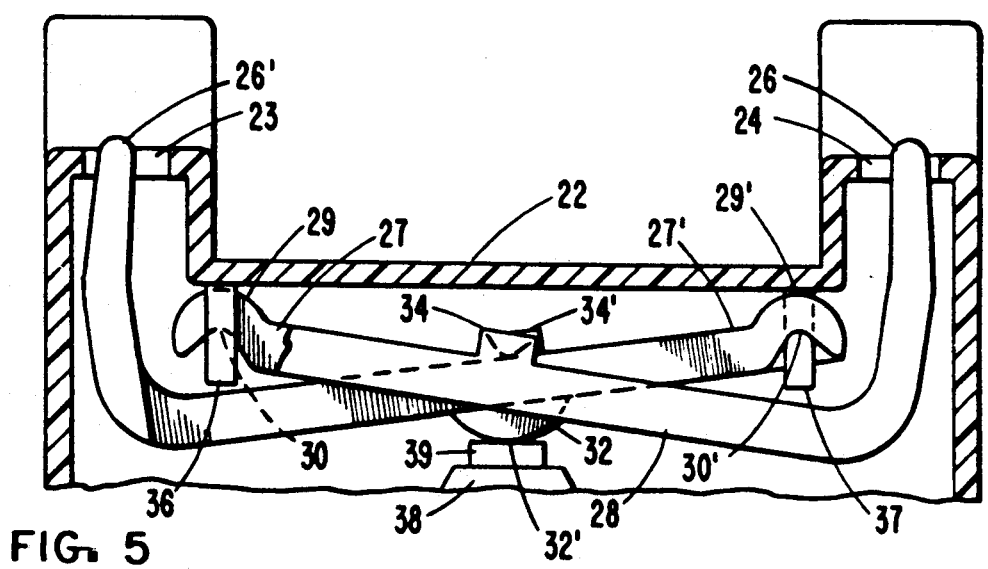
FIG. 5 is a cross-sectional view of the handset cradle assembly as shown in FIG. 4 with the plungers depressed to their lowermost position and the telephone set in an on-hook state.

The mechanism formed by the two members 25 and 25' operates as follows. When plunger 26 is depressed by application of a force on the plunger, even application of partial weight of the handset 11, when placed on one plunger, is sufficient to overcome the force biasing the actuator piston 39, member 25 moves in a downward direction while pivoting about its pivot point 36. Knife edge 35 of projection 34 also moves down and applies a force to finger 27' forcing member 25' to also move down in unison whereby plunger 26' also moves down. The curved surfaces 32 and 32' of projections 31 and 31' are in continuous contact with the actuator piston 39 and move the piston 39 down working the line switch 38. When the force which is applied to plunger 26 is removed, the spring biased piston 39 pushes up on the curved surfaces 32 and 32', moving members 25 and 25' up against the surfaces of the cradle 21, thereby returning plungers 26 and 26' to their normal uppermost positions. As can be readily seen from FIGS. 4 and 5, the distance of travel is that require for actuator piston 39 to work line switch 38 can be readily determined by the geometry of the members 25 and 25', that is, location of the pivot points for the members, location of the curved surfaces 32 and 32', as well as the amount of travel of plungers 26 and 26'.

We claim:

1. A telephone handset cradle assembly comprising:
    a housing having a cradle for receiving a telephone handset with said cradle having a pair of laterally spaced openings;
    a line switch having a spring biased actuator piston located in said housing below the cradle with said piston oriented such that its movement is parallel to the vertical axis of said housing;
    a mechanism for operating said switch comprising;
    a pair of substantially identical members with each member having a plunger extending from one of its ends wherein said plunger is adapted to pass through one of said openings in the cradle and wherein the other end of each member is arranged to pivotally mount within said housing;
    said members assembled in an opposing relationship to each other forming said mechanism such that the plungers are located at opposite ends of the assembled mechanism and the mechanism is located within the housing between the cradle and the line switch with the free ends of the plungers extending through the openings on said cradle and adapted to move freely through its respective opening in substantially vertical direction in response to the movement of its pivotally mounted member;
    means located on each member to extend partially towards the other member for releasably engaging the other member when one of the members pivots in response to depression of its plunger forcing said other member to pivot thereby moving the other plunger down in unison with the downward movement of the depressed plunger; and
    means located on each member for contacting the actuator piston of said line switch.

2. A cradle assembly in accordance with claim 1 wherein said members comprising the mechanism are molded from thermosetting plastic material.

3. A cradle assembly in accordance with claim 1 wherein each said member includes first and second bifurcated fingers extending substantially perpendicular from their respective plunger.

4. A cradle assembly in accordance with claim 3 wherein said means for contacting said piston comprises a projection terminating in a curved surface extending from the first finger of each member.

5. A cradle assembly in accordance with claim 3 wherein said engaging means comprises a projection extending from the second finger of each member said projection terminating in a substantially knife edge surface.

6. A cradle assembly in accordance with claim 5 wherein the members are assembled in an opposing relationship such that the first finger of each member is positioned between the first and second fingers of the other member.

7. A cradle assembly in accordance with claim 6 wherein said knife edge surface extending from the second finger of each member is positioned above the first finger of the other member.

8. A telephone handset cradle assembly comprising:
    a housing having a cradle for receiving a telephone handset;
    a pair of substantially vertically movable, laterally spaced plungers each having one free end passing from said cradle through openings in said housing with the other end being located within said housing;
    a member extending substantially perpendicular from the other end of each plunger having its free end pivotally mounted within said housing;
    a line switch located in said housing below said pivotally mounted members with said line switch having a spring biased actuator piston;
    means located on each pivotally mounted member to extend partially towards the other member and responsive to the downward movement of one of the depressed plungers for releasably engaging the other pivotally mounted member forcing said other member to pivot thereby moving the other plunger down in unison with the movement of the depressed plunger; and
    means located on at least one of the pivotally mounted members for contacting the actuator piston of said line switch and for moving said piston down a predetermined distance thereby activating the line switch.

9. A cradle assembly in accordance with claim 8 wherein each member extending from a plunger comprises a pair of bifurcated fingers.

10. A cradle assembly in accordance with claim 9 wherein said members are assembled in an opposing relationship such that one bifurcated finger of a member is located between the two fingers of the other member.

11. A cradle assembly in accordance with claim 10 wherein each plunger and its member combination is substantially identical to the other plunger and its member combination.

12. A cradle assembly in accordance with claim 11 wherein each plunger and its member are molded from thermoplastic material.

* * * * *